United States Patent [19]
Belzile et al.

[11] 3,807,253
[45] Apr. 30, 1974

[54] BRAKE PEDAL FOR A DRIVER INSTRUCTION VEHICLE

[76] Inventors: Gilles Belzile, 10,750 Balsac, Montreal North, Quebec; Jean Belzile, 16 Plante Ave., Levis, Cte Levis, Quebec, both of Canada

[22] Filed: Jan. 2, 1973

[21] Appl. No.: 320,563

[52] U.S. Cl. .................................. 74/512, 74/520
[51] Int. Cl. ............................................. G05g 1/14
[58] Field of Search ..................... 74/512, 520, 560; 180/77 C; 280/150 B

[56] References Cited
UNITED STATES PATENTS
2,710,547  6/1955  Davenport ..................... 180/77 C

*Primary Examiner*—Leonard H. Gerin
*Assistant Examiner*—Frank H. McKenzie, Jr.
*Attorney, Agent, or Firm*—Raymond A. Robic

[57] ABSTRACT

A brake pedal for a driver instruction vehicle is disclosed in which the lever of the brake pedal is articulated intermediate its ends, the pivotal connection being normally locked to keep the lever rigid by an over-center link arrangement which can be unlocked under the control of the instructor. The master brake cylinder piston rod is connected to the lever at the articulation point so that in the unlocked position of the link arrangement, the part of the lever which carries the pedal will swing loosely and the brake pedal will be inoperable to actuate the brake system. In the unlocking position, the control rod which unlocks the link arrangement is effective to actuate the master cylinder piston rod and to operate the braking system. The purpose of the device is to allow the instructor to take over the braking function while at the same time rendering the student's brake pedal ineffective, when he foresees a panic situation which might cause the student to overreact and apply the brake too suddenly.

10 Claims, 5 Drawing Figures

PATENTED APR 30 1974 3,807,253

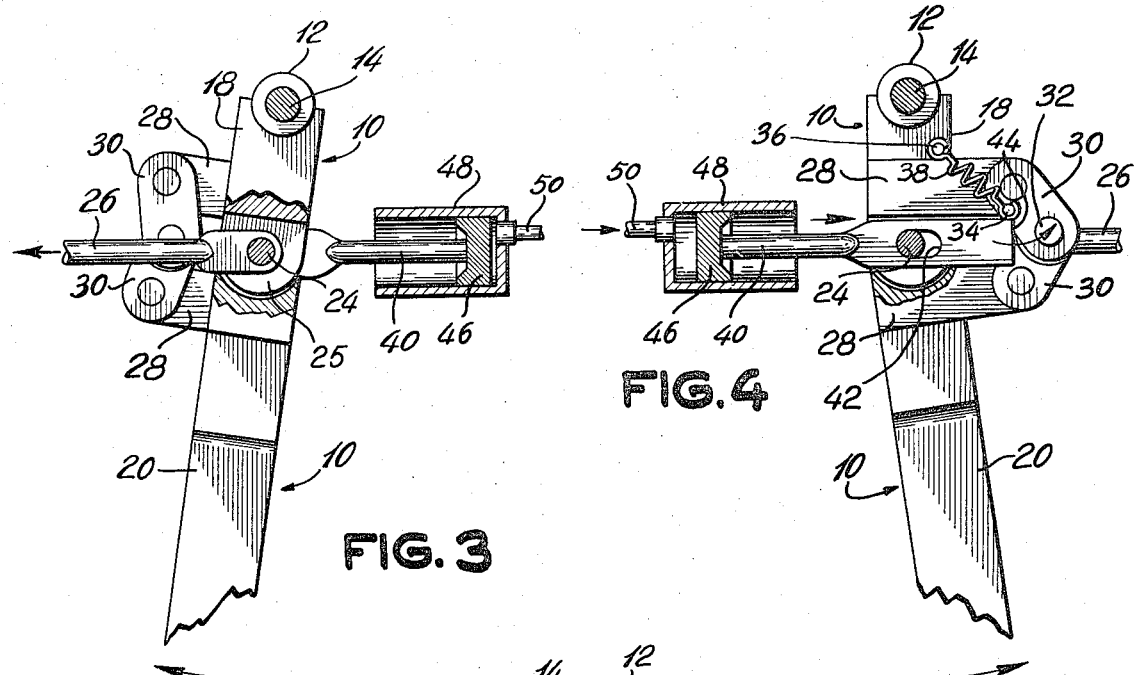
FIG. 3
FIG. 4
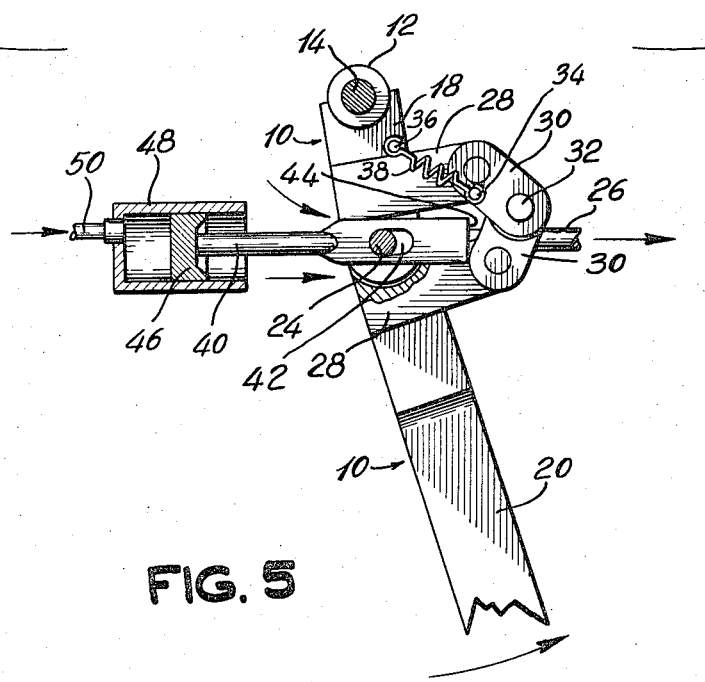
FIG. 5

BRAKE PEDAL FOR A DRIVER INSTRUCTION VEHICLE

The present invention relates to a brake pedal for a driver instruction vehicle.

Dual braking systems for driver instruction vehicles are well known. They enable the instructor to apply the brakes in case the student driver should fail to do so when necessary.

It is well known however that student drivers, not only sometimes fail to apply the brakes when needed but at other times have a tendency to overapply the brakes and jam down on the brake pedal thus endangering both themselves and the instructor and also possibly causing rear end collision with cars which may be following the instruction vehicle too closely.

It is an object of the present invention to provide a brake pedal arranged to be rendered inoperative at the option of the instructor when a situation comes up which is likely to cause the student to jam down on its brake pedal, control of the braking system being then available only to the instructor.

The invention accordingly provides a brake pedal for a driver instruction vehicle having a braking system, the pedal comprising a lever pivoted at one end to the vehicle and having a pedal mounted at the other end, a pivotal connection means dividing the lever into two portions pivotable with respect to each other, locking means associated with the pivotal connection means to connect the two lever portions rigidly together, control means associated with the locking means to selectively lock and unlock the locking means and a connecting means between the lever and the brake system connected only to the portion of the lever between the pivotal connection and the end pivoted to the vehicle.

With this arrangement when the locking means are unlocked by the control means which is under the control of the instructor, the portion of the lever between the pedal and the pivotal connection means swings freely and cannot be made to actuate the connecting means between the lever and the brake system which as above stated are connected only to the portion of the lever between the pivotal connection and the end pivoted to the vehicle. Further according to the invention, the control means is connected to the braking system to operate the same in the unlocked condition of the locking means thereby placing control of the vehicle braking system in the hands of the instructor.

More specifically according to the invention, the control means is connected to the connecting means between the lever and the braking system to operate the braking system in the unlocked condition of the locking means. As a result, no separate braking systems and no alterations in the braking system of the car are needed. An ordinary car can be converted to a dual control by means of the invention simply by installing a brake pedal according to the invention and an additional brake pedal or other control member for the instructor and establishing a connection between the instructor's control member and the aforementioned control means.

Further according to the invention, the locking means comprises a pair of links pivoted to each other and each pivoted respectively to one of the lever portions at points displaced laterally in the direction of brake actuation movement of the lever and an abutment connected between the lever and at least one of the links to hold the links in over-center locking position, the control means comprising a member engageable with at least one of the links to move the links past the over-center locking position. This arrangement is simple and inexpensive yet safe and effective.

More specifically, the locking means further comprises a resilient means urging the links into the over-center locking position thereby further simplifying the construction of the control means which needs to be arranged merely as a pushing member engageable with the links.

Still more specifically, the abutment is constituted by part of the control means which further simplifies the arrangement.

Further according to the invention, the connecting means between the lever and the brake system comprises a rod pivotally connected to the pivotal connection means and extending in the direction of brake actuation movement of the lever. The control means comprises a rod pivotally connected to the pivotal connection means and extending in the opposite direction, the rod being also slidably mounted to the pivotal connection means within a limited range and comprising a portion engageable with the locking means for unlocking the same within the aforementioned limited range of sliding movement and a portion engageable with the pivotal connection means to actuate the connecting means beyond the limited range of sliding movement. This arrangement still further simplifies the construction according to the invention in that a single pivotal connection can be provided to effect articulation of the lever portions and connection of the lever to the master cylinder piston rod and to the control means under the control of the instructor.

Still according to the invention, the rod constituting the control means has one end thereof positioned at one extremity of the limited range of sliding movement to provide an abutment engageable with at least one of the links to hold the links in over-center locking position, the mentioned end of the rod moving at the opposite extremity of the limited range of sliding movement past a position wherein it moves the links beyond the over-center locking position. As mentioned above, this arrangement avoids the necessity of providing an abutment as a separate element distinct from the control means rod.

Further according to the invention, the rod end is engabeable with the links at the pivotal connection therebetween, this pivotal connection constituting the only part of the links endowed with rectilinear movement during the unlocking of the links. Such rectilinear movement can be aligned to coincide with the longitudinal movement of the rod.

A preferred embodiment of the invention is illustrated by way of example in the accompanying drawings in which:

FIG. 3 is an elevation corresponding to FIG. 2 showing the pedal partly depressed by the student;

FIG. 4 is an elevation from the side opposite to FIGS. 2 and 3 showing the pedal in unlocked condition;

FIG. 5 is an elevation corresponding to FIG. 4 showing the braking system being operated by the instructor.

Figure 1:
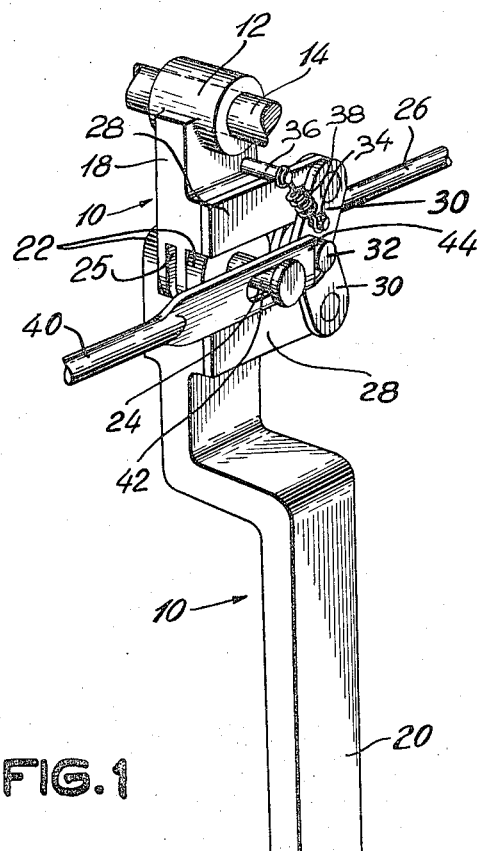
FIG. 1 is a perspective view of a brake pedal according to the invention.
Figure 1:
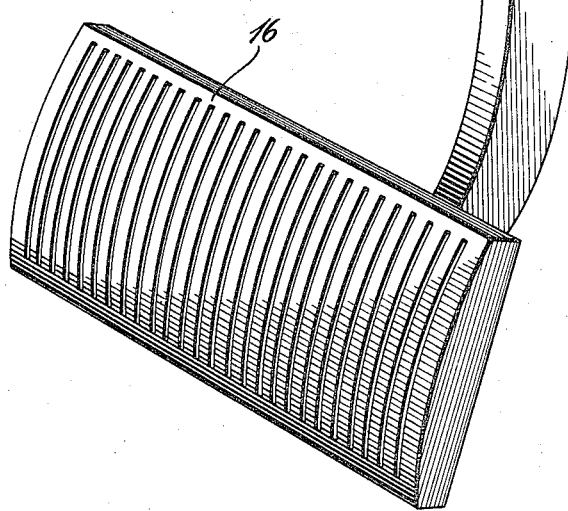

Referring to the drawings, particularly FIG. 1, the brake pedal assembly in the embodiment illustrated, comprises a lever 10 with a bearing 12 at the upper end by means of which it is pivoted on a shaft 14 connected to the vehicle by means not shown such as a bracket. At its lower end, the lever 10 has rigidly attached thereon a foot plate or a pedal proper 16.

The lever 10 is divided into a short upper portion 18 and a long lower portion 20 by a pivotal connection including a pair of lugs 22 at the upper end of lever portion 20 receiving therebetween the lower end of lever portion 18 and connected together by a pin 24.

The lower end of lever portion 18 is slotted at 25 to receive, pivotally connected on pin 24, the end of a connecting rod 26 which constitutes or is connected to the piston rod (not shown) of the brake system master cylinder (not shown).

Each of the lever portions 18 and 20 has rigidly secured thereon near and equidistant to the pivotal pin 24 a laterally extending arm 28 both arms 28 extending in the same direction as the connecting rod 26 that is in the direction of brake actuation movement of the lever as indicated by arrows at the bottom of FIGS. 3 to 5.

Two pairs of links 30 are pivotally connected at the outer ends of arms 28 and the link pairs are also pivotally connected to each other by a pin 32 which projects laterally outwardly some distance beyond the links 30. The upper link pair 30 carries a rigid pin 34 intermediate its pivotal connections and the upper lever portion 18 carries another pin 36 adjacent arm 28. Pins 34 and 36 are joined by a tension coil spring 38.

The pivotal pin 24 carries on the side of the lever 10 opposite the connection of rod 26, a control rod 40 having a slot 42 slidable and pivotable on pin 24. Rod 40 has a butt end 44 engageable with the link pin 32. As seen in FIGS. 2 to 5, rod 40 is connected to the piston 46 of a hydraulic cylinder 48 fed with hydraulic fluid through tubing 50.

Operation: brake pedal assembly 10, 12, 16 is installed in a vehicle on the pin 14 after removal of the originally supplied brake pedal. The connecting rod 26 is placed on pin 24, the hydraulic cylinder 48 is connected in a suitable position to the vehicle body by means for example of a bracket not shown, hydraulic connection 50 is connected to another cylinder (not shown) operated by a brake pedal (not shown) which is installed on the instructor's side of the front seat foot well of the vehicle. This latter hydraulic cylinder and the illustrated hydraulic cylinder 48 are in a master-slave relationship. Alternatively, another connection, such as by means of levers and linkage, may be provided between the instructor's pedal and the rod 40. The instructor's pedal may also be replaced if desired by another control member such as a lever placed wherever convenient.

Figure 2:
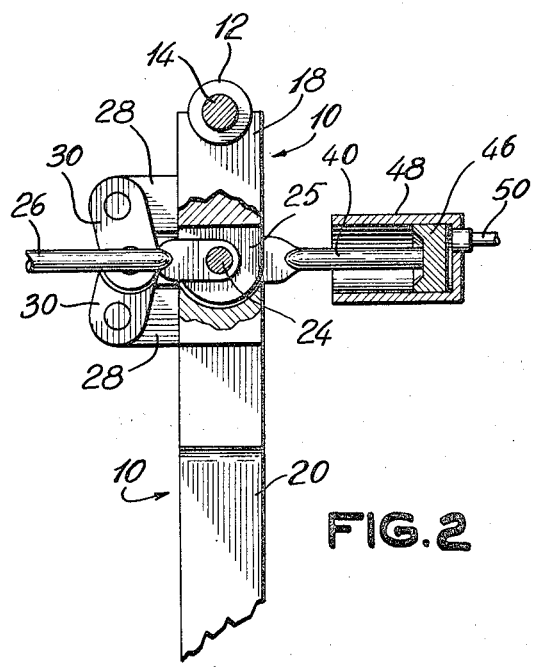
FIG. 2 is a fragmentary elevation of the brake pedal in locked condition seen from the side towards the rear of FIG. 1.

Normally, the spring 38 urges the links 30 into the position shown in FIGS. 1, 2 and 3 with the pin 32 in contact with the butt end 44 of rod 40 and the pin 24 at the outer end of slot 42. This position of links 30 is an over-center locking position which holds lever portions 18 and 20 rigidly aligned. In this position therefore, the student may push down on pedal 16 and operate the vehicle braking system through the connecting rod 26.

When the instructor foresees a panic situation which may cause the student to jam down on the break pedal, the instructor operates his control means causing piston 46 and rod 40 to move towards the links 30 within the limited range of sliding movement given by slot 42. As a result, the end 44 of rod 40 pushes on pin 32 and moves the links 30 beyond a center position in which the pivotal connections of the links are in line. Thereupon, lever portions 18 and 20 are no longer rigidly locked together and the student can push down on pedal 16 causing the lever portion 20 to swing loosely and pivot with respect to lever portion 18. When the rod 40 has moved to the end of the sliding range given by slot 42, it engages pin 25 and is thus directly connected with the connecting rod 26 whereby the instructor is enabled to operate the vehicle braking system with his own control member.

It will be seen that the device according to the invention can easily be installed in any vehicle to turn it in to a dual controlled vehicle without any alterations being necessary in the braking system itself and with all the additional braking system parts being installed in the vehicle interior. The device can also be easily removed if it is desired to return the vehicle to a single brake operation or if the vehicle is to be discarded and the device to be installed in another vehicle.

We claim:

1. Braking system including a brake pedal for a driver instruction, the pedal comprising:
   a lever pivoted at one end to the vehicle and having a pedal mounted at the other end,
   a pivotal connection means dividing said lever into two portions pivotable with respect to each other;

locking means associated with said pivotal connection means to connect said two lever portions rigidly together;
   control means associated with said locking means to selectively lock and unlock said locking means; and a connecting means between said lever and said brake system connected only to the portion of said lever between said pivotal connection and said end pivoted to the vehicle.

2. The brake system according to claim 1, wherein said control means is connected to said braking system to operate the same in the unlocked condition of said locking means.

3. The brake system according to claim 1, wherein said control means is connected to said connecting means between said lever and said braking system to operate said braking system in the unlocked condition of said locking means.

4. The brake system according to claim 1, wherein said locking means comprises a pair of links pivoted to each other and each pivoted respectively to one of said lever portions at points displaced laterally in the direction of brake actuation movement of said lever and an abutment connected between said lever and at least one of said links to hold said links in over-center locking position, said control means comprising a member engageable with at least one of said links to move said links past said over-center locking position.

5. The brake system according to claim 4, wherein said locking means further comprises a resilient means urging said links into said over-center locking position.

6. The brake system according to claim 4, wherein said abutment is constituted by part of said control means.

7. The brake system according to claim 1, wherein said connecting means between said lever and said brake system, comprises a rod pivotally connected to said pivotal connection means and extending in the direction of brake actuation movement of said lever.

8. The brake system according to claim 7, wherein said control means comprises a rod pivotally connected to said pivotal connection means and extending in the opposite direction, said rod being also slidably mounted to said pivotal connection means within a limited range and comprising a portion engageable with said locking means to unlock the same within said limited range of sliding movement and a portion engageable with said pivotal connection means to actuate said connecting means beyond said limited range of sliding movement.

9. The brake system according to claim 8, wherein said locking means comprises a pair of links pivoted to each other and each pivoted respectively to one of said lever portions at points displaced laterally in the direction of brake actuation movement of said lever, said rod having one end thereof positioned at one extremity of said limited range sliding movement to provide an abutment engageable with at least one of said links to hold said links in overcenter locking position, said end of said rod moving at the opposite extremity of said limited range of sliding movement past a position wherein it moves said links beyond said over-center locking position.

10. The system according to claim 9, wherein said rod end is engageable with said links at said pivotal connection between said links.

* * * * *